Nov. 14, 1933.   G. A. BOLE ET AL   1,934,788
SHEET METAL FACED STRUCTURAL AND INSULATING UNIT
Filed July 29, 1932
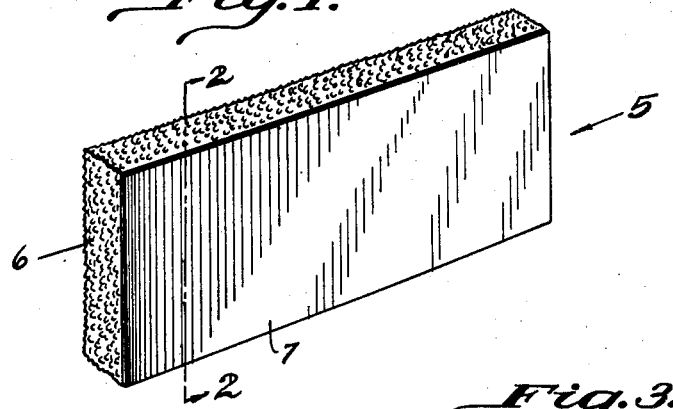
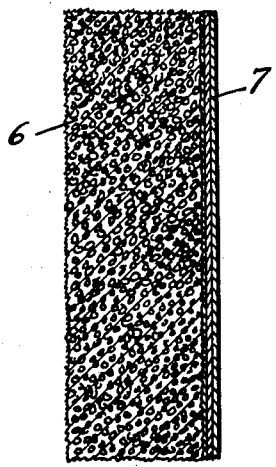
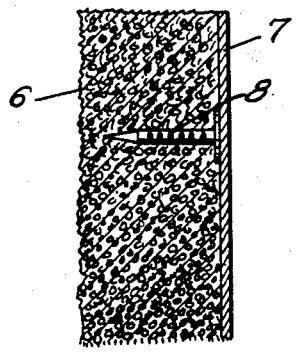
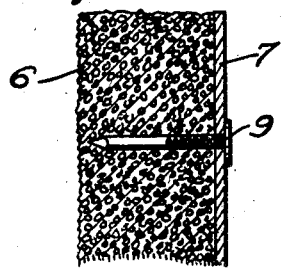
Inventors
G. A. Bole
J. D. Sullivan
By W. S. McDowell
Attorney Patented Nov. 14, 1933

1,934,788

UNITED STATES PATENT OFFICE 1,934,788

SHEET METAL FACED STRUCTURAL AND INSULATING UNIT

George A. Bole and John D. Sullivan, Columbus, Ohio, assignors to Battelle Memorial Institute, Columbus, Ohio, a corporation Application July 29, 1932. Serial No. 626,029

6 Claims. (Cl. 72—35)

This invention has for its underlying purpose the provision of a structural or insulating unit possessing lightness in weight, strength, improved appearance and high resistance to elemental disfiguration or destruction. It is an object of the invention to provide a unit possessing these characteristics and which is composed essentially of a facing of sheet metal, preferably copper or copper alloy and backed by a ceramic material, whereby the combined unit provides valuable insulating properties and also the esthetic appearance of copper or copper alloys.

It is another object of the invention to employ a light weight cellular backing preferably of a ceramic material since, owing to its porous or cellular nature, it is poor heat conductor, although the invention is not limited specifically to the employment of a cellular backing member.

In the event a cellular backing member or body is used, the same may be composed of various materials, concerning which cellular clay, calcined gypsum, plaster of Paris or concrete will serve as examples. Cellular plaster of Paris may be made by bloating ordinary plaster of Paris through the evolution of gases therein during the forming process, and by later permitting the material to set and dry. Cellular clay backing may be made by bloating ordinary clay through the evolution of gases during the forming process and later drying and firing the product, the fired material being then cut into units of desired shape and size. If cellular concrete is employed in the backing or body member, it may be formed in a manner similar to that of plaster of Paris, namely the development of gases in the material when the same is in a soft and more or less fluid state. These materials may also be made by incorporating a stable foam with a water slurry of clay, plaster or cement. Cellular clay may also be made by overfiring the mass so as to produce a pyro-plastic mass in which a gas is generated owing to the overfiring. Combustibles may also be burned out of clay to produce an open structure in the resulting product.

Owing to their porous nature, cellular units have low heat conductivity and thus possess valuable insulating properties, as well as being light in weight. Such porous materials, however, offer the serious disadvantage of being poor materials to use where atmospheric corrosion, such as rain, ice, sun, wind, and the like may attack them and in order to protect these materials and at the same time to improve the external appearance of a wall employing the same, the present invention resides in associating therewith a metallic facing, such facing being preferably formed from copper or an alloy containing a high percentage of copper.

For a further understanding of the invention, reference is to be had to the following description and the accompanying drawing, wherein:

Fig. 1 is a perspective view of a structural or insulating unit formed in accordance with the present invention;

Fig. 2 is a vertical sectional view taken through the unit on the plane disclosed by the line 2—2 of Fig. 1;

Fig. 3 is a similar view through a modified form of unit disclosing metallic fastening devices for uniting the cellular backing with the metallic facing;

Fig. 4 is a similar view illustrating a further modification.

Referring more particularly to the drawing, our improved structural and insulating unit is designated in its entirety by the numeral 5. The unit in the form of the invention disclosed in Figs. 1 and 2 comprises a cellular body 6 and a sheet metal facing 7 which is adapted to engage and to be held in closely united relationship with one or more surfaces of the body.

The unit may possess desired dimensions which are preferably uniform for facility in wall erection. As stated, the body 6 is usually formed from a porous or cellular material highly resistant to the transmission of heat and we have found bloated clay, plaster of Paris, calcined gypsum or concrete to be well suited for our purposes, although it is within the range of the invention to use a more compact or a non-bloated backing material if desired.

The fastening of the body 6 to the copper or copper alloy facing 7 may be accomplished in several ways, depending on the type of body material used. If cellular clay is employed, ordinary cement will suffice for small units where insulation alone is desired. For larger cellular clay units, we employ, as shown in Fig. 3, pins or lugs 8 which are first secured to the facing and are forced into or are embedded within the body material. Bolts or nails 9 passing through the metallic sheet into the cellular backing, as shown in Fig. 4, will suffice in many instances. In other instances, a combination of adhesive and mechanical fasteners may be desirable. In the case of calcined gypsum, plaster of Paris or concrete, the adherence may be effected by bloating the body material in contact with the metal sheet. Lugs or pins previously attached to the facing sheet may be used but, ordinarily, we have found that they are not needed in the case of plaster of Paris units.

If cellular bodies are not desired, the ceramic units may be made of compact material. For example, the backing may be of ordinary plaster of Paris caused to set by the reaction with water or the unit may be composed of ordinary concrete. While such dense units possess desirable properties, especially where strength is required, for most purposes we prefer the cellular type of backing, since it is lighter in weight and possesses better heat insulating properties.

The sheets of copper or copper alloy used as a preferred facing may be employed in their natural condition, although to secure improved appearance, decorative effects and permanency, we prefer to enamel the outer surface of the facing to protect said surface from change, owing to atmospheric corrosion or other cause. The sheet may be coated with a thin vitreous coating transparent or otherwise, whereby the original color of the base metal is preserved and protected from atmospheric deterioration. By treating the copper or copper alloy surface either chemically or electrolytically previously to applying a vitreous coating, many varied colored effects may be obtained, and these effects are permanently preserved by the glassy coat. The copper or copper alloy sheets should preferably be enameled before installation of the cellular backing. For plaster of Paris or gypsum backings, it is essential that the metal sheet be enameled first, while for cellular clay either procedure may be followed although, as stated, it is preferable to enamel before the backing is installed.

For some purposes, a color or tint may be developed on the sheet by heat or by chemical or electrolytic methods, and the sheet thus used has a facing for the ceramic unit without enameling or further treatment.

We use the word ceramic in the specification and claims in its wide connotation to include cement and plaster of Paris as well as fired clay.

What is claimed is:

1. An architectural and structural unit comprising a sheet metal facing, a backing of burned cellular ceramic material joined with the facing, and a vitreous coating applied to the exterior surface of the facing.

2. As a new article of manufacture, a structural unit comprising a body of burned cellular argillaceous material of substantially uniform composition throughout and of predetermined shape and dimensions, and a sheet metal facing joined with said body and covering one of the surfaces thereof.

3. An insulating unit comprising a burned cellular ceramic body of substantially uniform composition throughout and of predetermined shape and dimensions, a sheet metal facing of copper or copper containing alloy of a size to cover one of the surfaces of said body, and mechanical fastening means for joining said facing with said body.

4. As a new article of manufacture, a building unit comprising a burned cellular body of moldable refractory material of substantially uniform composition throughout and of predetermined shape and dimensions, a sheet metal facing joined with and completely covering one of the surfaces of said body, and a decorative coating applied to the outer surface of said facing.

5. As a new article of manufacture, an architectural and structural unit comprising a body member composed of burned cellular ceramic materials of substantially uniform composition throughout and of predetermined shape and dimensions, a sheet metal facing joined with and completely protecting one of the surfaces of said body, and a preservative coating applied to the outer surface of said facing.

6. As a new article of manufacture, a structural unit comprising a body of burned cellular argillaceous material of substantially uniform composition throughout and of predetermined shape and dimensions, and a sheet metal facing containing copper joined with said body and covering one of the surfaces thereof.

GEORGE A. BOLE.
JOHN D. SULLIVAN.